United States Patent Office 3,475,181
Patented Oct. 28, 1969

3,475,181
ICE CREAM MIX
Paul Kracauer, New York, N.Y., assignor to Packaged Products Corp., Brooklyn, N.Y.
No Drawing. Filed Apr. 25, 1966, Ser. No. 544,704
Int. Cl. A23g 5/00
U.S. Cl. 99—136
8 Claims

ABSTRACT OF THE DISCLOSURE

This invention relates to dry ice cream mixes composed of whole milk solids, sweetener, non-fat dry milk, vegetable oil, glucono delta lactone, propylene glycol and flavoring, which mixes can be easily mixed with water, for example by the home consumer, and which when so mixed rapidly freeze into an ice cream of excellent consistency and taste.

---

Ice cream is conventionally produced by heating gelatin to dissolve it with cream, milk, water, sugar, flavors and possibly fillers, and then mixing and homogenizing the mixture which is then frozen while being rotated. The resulting ice cream is then stored at very low temperatures, well below 0° F.

As a practical matter, ice cream can only be produced by manufacturers with special equipment. Ice cream is rarely made at home by the ultimate consumer. In the cases where ice cream is made at home by the ultimate consumer, special equipment is necessary and there are in fact special ice cream freezers available on the market, comprising stirring and freezing units, for those who do wish to make their own ice cream. However, no simple ice cream mix is available which permits any consumer to easily make ice cream in his own home.

It is accordingly a primary object of the present invention to provide a dry mix which can be easily converted into ice cream in the home by any consumer, in fact even by children.

It is another object of the present invention to provide a dry powder mix which contains all of the solid ingredients necessary for a good, palatable ice cream, which can be stored for a prolonged period of time, and which can be simply mixed with a liquid, preferably water, and frozen in a very short time in the home freezer by the ultimate consumer.

It is yet another object of the present invention to provide a method of preparing ice cream which uses simple procedural steps of mixing for a short period of time e.g.. by shaking or agitation, followed by freezing in the freezer compartment of a refrigerator or in a home deep freeze.

Other objects and advantages of the present invention will be apparent from a further reading of the specification and of the appended claims.

With the above and other objects in view, the present invention mainly comprises a dry, powder composition of whole milk solids, non-fat dry milk, an edible vegetable oil, a sweetener such as natural sugar (sucrose) or dextrose, glucono delta lactone, propylene glycol and flavoring.

In accordance with the method of the present invention, the above dry powder composition is mixed with water or milk, preferably water, with which it very quickly forms a uniform mixture, and then, in a suitable container, subjected to freezing temperatures, for example in the freezing compartment of a refrigerator or in a deep freeze, until solidification to ice cream. The time required for the solidification depends upon the temperature and the surface area of the container which is subjected to the cold temperature. In general, in normal containers shaped, for example, like a conventional ice cream pop, and at home freezer temperatures of about 0° F., the time required for solidification to a solid, edible ice cream is about 20 minutes to 40 minutes. Of course, the frozen ice cream can remain under freezing conditions over prolonged periods of time, just as in the case of commercially manufactured ice cream.

It should be noted that the compositions of the present invention can be prepared as sugar-free compositions by substituting an artificial sweetener such as a saccharine, e.g. sodium saccharine or calcium saccharine, or a cyclamate, e.g. sodium cyclamate or calcium cyclamate for the sugar. In such case, the amount of non-fat dry milk solids would be increased to make up the bulk lost by substituting the artificial sweetener for the sugar.

The amount of whole milk solids in the composition of the present invention is preferably between 30 and 60 parts by weight, while the amount of non-fat dry milk solids is preferably about 12–35 parts by weight. The amount of sugar, e.g. sucrose or dextrose, is preferably between about 20 and 40 parts by weight. In the event that a saccharine is substituted for the sugar, then the amount of saccharine is preferably between about 0.05 and 0.1 part by weight, while in the case of cyclamate the amount is preferably between about 0.5 and 1.0 part by weight. The difference between the parts by weight of saccharine or cyclamate and the parts by weight of sugar would then be made up by increasing the quantity of the non-fat dry milk solids.

In addition to the above, the composition should contain preferably between 2–8 parts by weight of vegetable oil, between 0.2 and 5 parts by weight of glucono delta lactone, and between 0.1 and 0.4 by weight of propylene glycol. Flavoring and coloring is then added q.s. 100 parts.

The dry powdered mixture is preferably prepared by mixing the flavors and coloring matter with the sweetener, preferably sugar, glucono delta lactone and propylene glycol then adding the vegetable oil and non-fat dry milk solids to form a uniform mixture and finally adding the whole milk solids to the mixture. The entire mixture may then be sifted so that uniform powder size is obtained and packed.

In preparing the ice cream, the dry mixture is mixed with whole milk, skimmed milk or water, preferably water, in a ratio of about 1 part of the mixture to between 0.8–2 parts of the liquid. Most preferably, the ratio is 1 part of mixture to about 1.5 parts of the liquid, which is most preferably water.

The liquid and the dry mix can be shaken or stirred for just a few moments to form a uniform liquid suspension which is then subjected, if desired after first pouring into a particular container, to freezing temperatures, preferably at below about 0° F. After about 20 to 40 minutes the composition is hardened into an ice cream of perfect consistency and taste. The flavor is indistinguishable from commercially obtainable ice cream of the same flavor.

The components of the composition of the present invention coact in the following manner. The non-fat dry milk solids and the oil mixed with the whole milk solids when shaken with water immediately form a uniform emulsion without any lumps. This emulsion does not separate.

The propylene glycol has several effects. It enhances the rapid formation of the uniform emulsion free of lumps without interfering with the speed of the freezing. In addition, after freezing, the propylene glycol maintains the desirable softness of the ice cream even under extreme freezing conditions so that the ice cream does not become "rock hard" but remains easily spoonable and eatable. The propylene glycol cannot be present in too great a quantity because it would result in liquefication of the ice cream unless the ice cream were kept under extremely low temperatures.

The propylene glycol also acts to harden the dry mixture tot a certain degree. This is of importance because the oil plus the soft whole milk solids might otherwise be too "oily" and not as easy to mix and emulsify with the water. Still another effect of the propylene glycol is to act as an anti-oxidant.

The glucono delta lactone does not in any way change the taste of the product, but its presence is of importance in helping to speed the freezing process. In water the glucono delta lactone is very slowly decomposed into equal parts of gluconic acid and delta/gamma lactones. This is a hydrolyzation action. This chemical process makes the liquefied mixture slightly more porous, thus permitting a faster freezing of the aqueous part of the liquid and consequently greatly increasing the speed of the overall freezing process. This is of course of considerable importance because the maker of the ice cream is generally anxious to have it frozen as quickly as possible, and moreover because under conditions of home freezing the temperatures are not as low as in the case of commercial manufacture of ice cream.

An important advantage of the present invention over known methods of making ice cream is that it is unnecessary to continuously agitate and stir the composition during the freezing. After simple mixing of the dry mix with water and pouring into a container it is sufficient to permit the container to rest under freezing conditions and the ice cream is rapidly formed in this manner.

The liquefied mixture which is subjected to freezing according to the present invention is so perfect due to the presence of the oil, propylene glycol and the glucono delta lactone that no crystals are formed within the frozen ice cream.

As is quite apparent, the ice creams of the present invention can be made in any desired flavor and in any desired shape or form. Thus, suitable flavors include, but are not limited to chocolate, vanilla, chocolate plus chocolate chips, chocolate plus nuts, coffee, butterscotch, lemon, strawberry (including real strawberry), fruit sherbets, etc. The ice cream can be frozen between two biscuits to make ice cream sandwiches, it can be frozen in a chocolate shell to make ice cream pops, etc.

The following example is given to further illustrate the present invention. The scope of the invention is not however, meant to be limited to the specific details of the example.

Example 4 parts of cocoa are mixed with 26 parts by weight of natural sugar, 0.4 part of glucono delta lactone and 0.2 part of propylene glycol. 3 parts of vegetable oil are mixed with 20 parts of non-fat dry milk to form a uniform mixture. The two mixtures are then uniformly mixed together and 50 parts of whole milk solids are added and uniformly mixed. The whole is then sifted and packed in foil envelopes, each containing about 4 ounces. To make the ice cream, a 4 ounce package is emptied into a container and 6 ounces of tap water are added thereto. The whole is shaken for a few moments to form a uniform highly liquid suspension which is then poured into a container and placed in a freezer at a temperature of about 0° F. After about 25 minutes the entire mass is frozen into a chocolate ice cream of perfect consistency and taste.

While the invention has been illustrated in particular with respect to specific compositions for ice cream mixes and methods of making the same, it is apparent that variations and modifications can be made without departing from the spirit or scope of the invention. Such variations and modifications accordingly are meant to be comprehended within the meaning and scope of equivalents of the appended claims.

I claim:
1. A dry composition which can be mixed with a liquid selected from the group consisting of whole milk, skimmed milk and water and frozen to form ice cream, said composition consisting essentially of between about 30 and 60% by weight whole milk solids, a sweetener selected from the group consisting of sugar in an amount of between about 20 and 40% by weight, saccharine in an amount of about 0.05–0.1% by weight and cyclamate in an amount of about 0.5–1% by weight, non-fat dry milk in an amount between about 12 and 35% by weight when said sweetener is sugar, in an amount between about 32 and 75% by weight when said sweetener is saccharine and in an amount between about 31 and 74% by weight when said sweetener is cyclamate, vegetable oil in an amount of about 2–8% by weight, glucono delta lactone in an amount of about 0.2–5% by weight, propylene glycol in an amount of about 0.1–0.4% by weight and flavoring.

2. A composition according to claim 1 wherein the amount of whole milk solids is between about 30 and 60% by weight, the sweetener is selected from the group consisting of sucrose and dextrose and is between about 20 and 40% by weight, and the non-fat dry milk is between about 12 and 35% by weight.

3. A composition according to claim 1 wherein the amount of whole milk solidse is between about 30 and amount of whole milk solids is between about 30 and 60% by weight, the sweetener is a saccharine in an non-fat dry milk is between about 32 and 75% by weight.

4. A composition according to claim 1 wherein the amount of whole milk solids is between about 30 and 60% by weight, the sweetener is a cyclamate in an amount of about 0.5–1% by weight and the non-fat dry milk is present in an amount of about 31–74% by weight.

5. The method of forming ice cream which comprises agitating the composition of claim 1 with a liquid selected from the group consisting of whole milk, skimmed milk and water in a ratio of about one part of said composition to about 0.8–2 parts of said liquid, and subjecting the thus obtained mixture to freezing temperature for at least about 20 minutes.

6. A method according to claim 5 wherein the composition of claim 2 is used.

7. A method according to claim 6 wherein said liquid is water.

8. A method according to claim 7 wherein the ratio of said composition to said liquid is about 1:1.5.

References Cited

UNITED STATES PATENTS

| 3,183,098 | 5/1965 | Baur | 99—136 |
| 3,017,276 | 1/1962 | Knightly | 99—136 |

OTHER REFERENCES

Feldberg, "Cereal Science Today," April 1959, pp. 96, 98, 99.

RAYMOND N. JONES, Primary Examiner

R. W. ELLIOTT, Assistant Examiner